March 20, 1962 — M. RAPPAPORT — 3,026,449
DEVICE FOR VISUAL OBSERVATION OF VOCAL CORDS
Filed Sept. 18, 1959 — 2 Sheets-Sheet 1
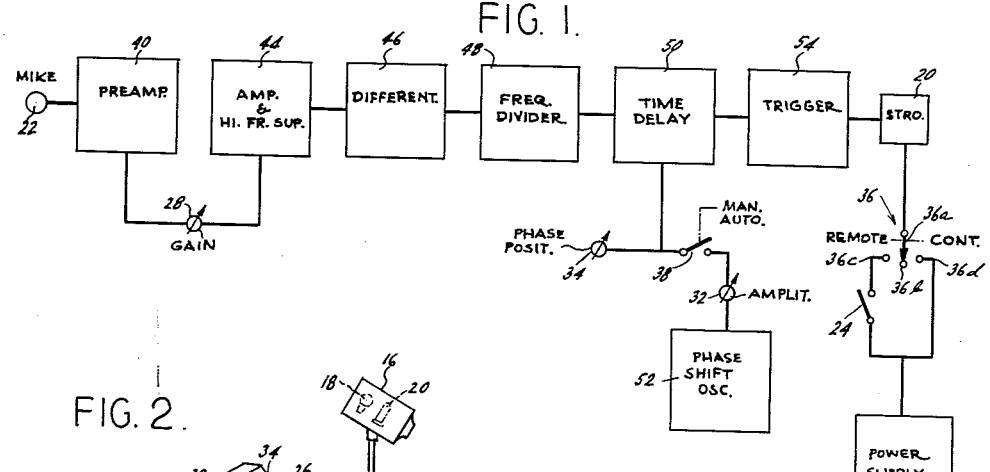
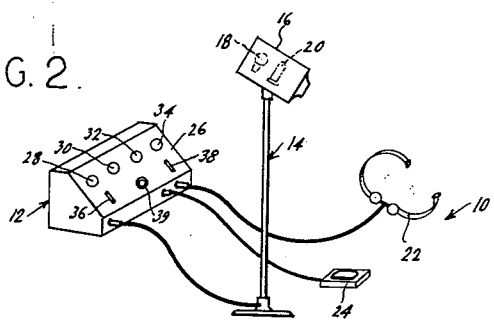
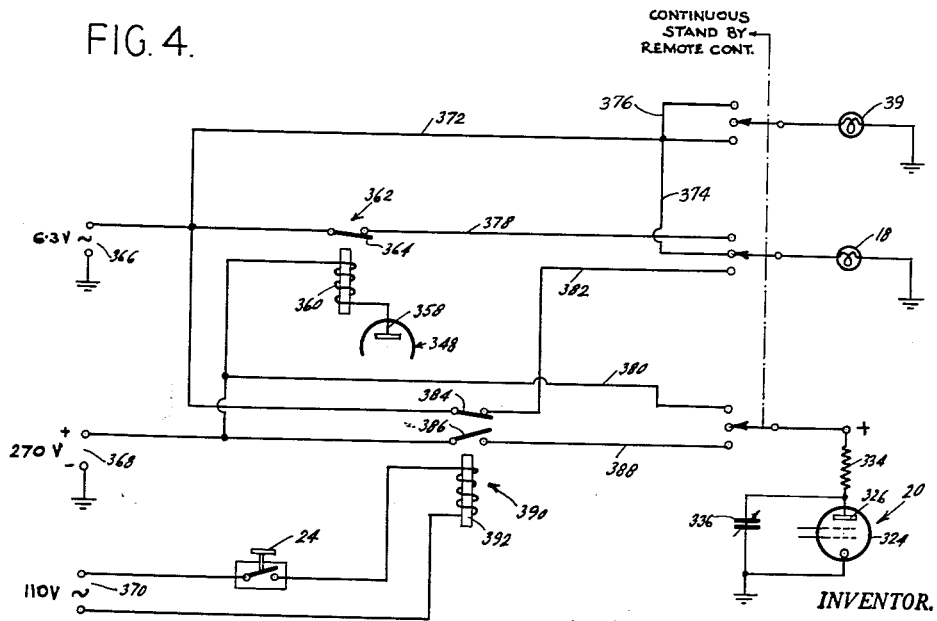
INVENTOR.
MAXIMILIANO RAPPAPORT
BY
Amster + Levy
ATTORNEYS March 20, 1962 M. RAPPAPORT 3,026,449
DEVICE FOR VISUAL OBSERVATION OF VOCAL CORDS
Filed Sept. 18, 1959
2 Sheets-Sheet 2

INVENTOR.
MAXIMILIANO RAPPAPORT
BY
Amster + Levy
ATTORNEYS

United States Patent Office 3,026,449
Patented Mar. 20, 1962

3,026,449
DEVICE FOR VISUAL OBSERVATION OF VOCAL CHORDS
Maximiliano Rappaport, 406 Elm Ave., River Edge, N.J.
Filed Sept. 18, 1959, Ser. No. 840,930
11 Claims. (Cl. 315—166)

The present invention relates generally to a device for the visual observation of vocal cords, and in particular to a stroboscopic inspecting apparatus for viewing the vocal cords while in motion during phonation by the subject under observation.

Direct and indirect visual observation of the vocal cords of a human being during sound emission has been seriously hampered in that the frequency of vibrations of the human voice is at a frequency too rapid for the human eyes to follow. Resort had been made to various techniqnues for observing the vocal cords during human phonation, including the taking of high speed movies and attempted stroboscopic inspection. Some limited success has been achieved with photographing the vocal cords at a relatively high speed, but this approach is time consuming and exceptionally expensive. Past attempts at stroboscopic inspection of the larynx during phonation has not been successful in that the human being is incapable of maintaining a fixed and uniform frequency to which the stroboscope can be conveniently synchronized, it being realized that an indispensible prerequisite for stroboscopic inspection is that the frequency of the light flashes of the stroboscope must be perfectly synchronized with the frequency of vibration of the moving object. Indeed, even with carefully trained subjects, erratic variations in frequency has been found to be characteristic of human phonations; and due to such erratic variation the stroboscopic observation of the vocal cords results in blurred shadowy glimpses of the cords which is not particularly suited for the careful study of the vocal cords.

Broadly, it is an object of the present invention to provide an improved larynx inspecting device which obviates one or more of the aforesaid difficulties. Specifically, it is within the contemplation of the present invention to provide a stroboscopic device for the inspection of the larynx of the human being while in motion which enables the easy study of the vocal cords, despite the erratic variations in frequency of human phonation.

In accordance with an illustrative embodiment demonstrating features of the present invention, there is provided a device for visual observation of the vocal cords during movement and sound emission which comprises a microphone adapted to pick-up the relatively low frequency and erratically varying voice signal of a patient during phonation. Means are coupled to the microphone for amplifying the voice signal and for deriving a train of pulses at a repetition rate coincident with the varying fundamental frequency of the voice signal. The train of pulses is arranged to flash a stroboscopic light source in synchronism with the sound emission of the patient thereby enabling observation of the vibrating vocal cords in an apparently stationary or "frozen" position, regardless of the frequency of vibration of the vocal cords.

As a feature of the invention, provision is made for the observation of the vocal cords in any position of their natural displacement such that the vocal cords may be studied in any position of full cycle of their natural displacement. This aspect of the invention is realized by introducing variable time delays in the flashing of the stroboscopic light source in relation to the initial detection of the train of pulses.

As a further feature of the present invention provision is made for observation of the vocal cords in "slow motion," either under the manual control of the physician or under an automatic control, thus enabling the viewing of the vocal cords in successive relative positions during a full cycle of displacement.

As a still further feature of the present invention provision is made for normally illuminating the field of view from a continuous light source, with controls being provided to disrupt the energization of the continuous light source when the patient phonates and brings about the periodic pulsing or flashing of the stroboscopic light source in synchronism with the patient's phonation. Thus when the patient stops phonating the field is illuminated by the continuous light source.

The above brief description as well as further objects, features and advantages of the present invention will be more fully appreciated by reference to the following detailed description of an illustrative embodiment according to the present invention, when taken in conjunction with the accompanying drawings;

FIG. 1 is a block diagram of an improved larynx inspection device demonstrating features of the present invention;

FIG. 2 is a perspective view showing the console incorporating the circuitry of the larynx inspection device, with a light source, throat microphone, and foot switch being connected thereto;

Figure 3:
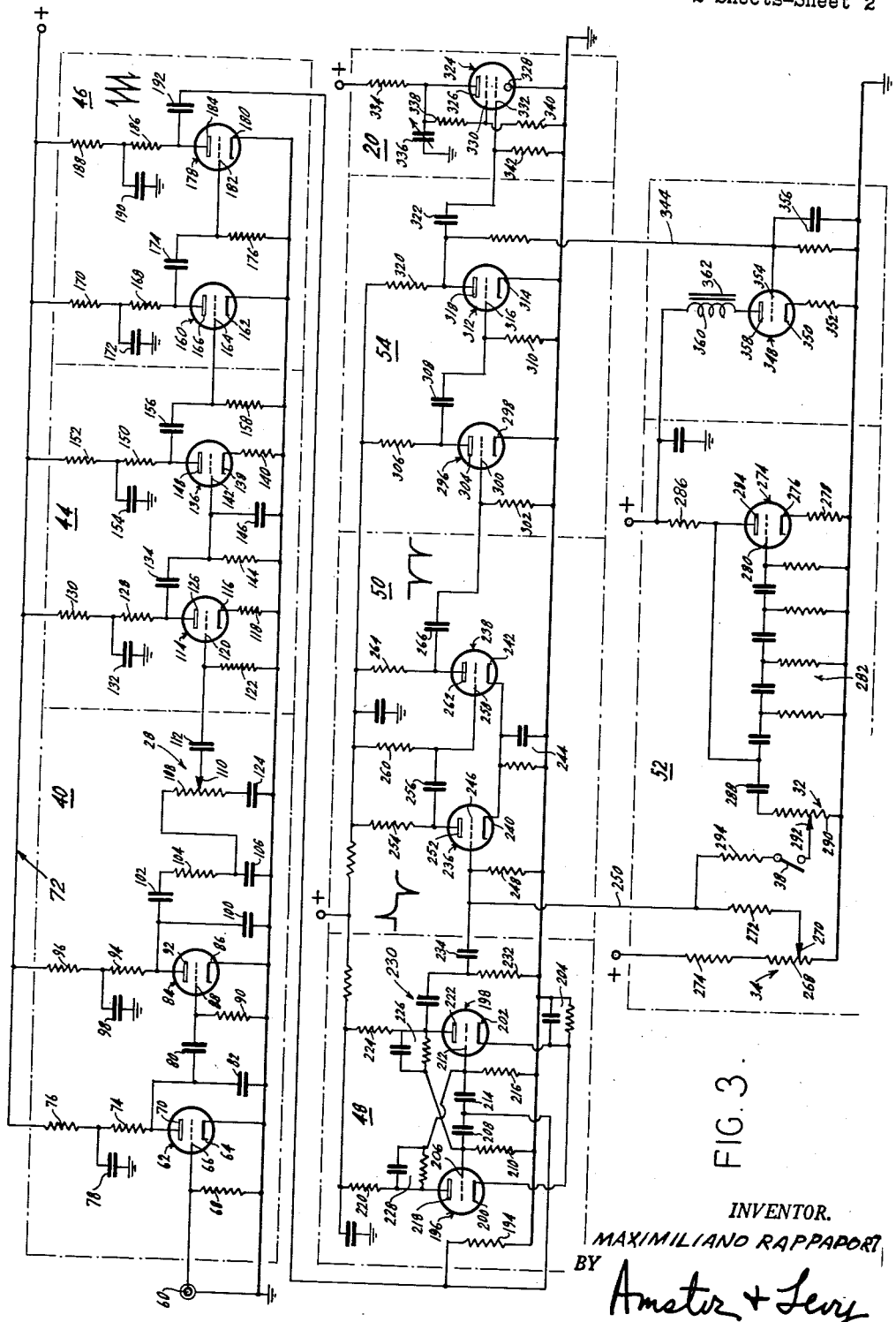
FIG. 3 is a schematic diagram of the typical control circuit which may be used for my improved larynx inspection device; and, FIG. 4 is a schematic and diagrammatic view of the circuitry incorporated in my improved larynx inspection device.

Reference will first be made to FIG. 2 of the drawings for a brief description of a typical device for visual observation of the vocal cords during movement and sound emission. The device, generally designated by the reference numeral 10, includes a console or housing 12 containing the required circuitry, an adjustable stand 14 having mounted thereon a light housing 16 containing an incandescent or continuous light source 18 and a stroboscopic or flashing light source 20, a pick-up for the complex relatively low frequency variable voice signal, such as the throat microphone 22, and a remote control for initiating operation of the stroboscopic inspection device, such as the foot switch 24. As will be described, the stroboscopic light source 20 produces flashes of light continuously synchronized with the fundamental (or subharmonic) vibration frequency of the patient's vocal cords as picked up by the throat microphone 22. Since each flash of the stroboscopic device or tube 20 is synchronized to the vibration of the vocal cords, the vibrating vocal cords will be illuminated, darkened and reilluminated rapidly in coincidence with the fundamental or subharmonic frequency of the voice signal such that the persistency of the retina gives the impression that the vocal cords are stationary and under constant illumination.

The housing 12 for the circuitry has a control panel 26 having a series of adjustable control, designated respectively by the numerals 28, 30, 32, and 34, and first and second selector switches designated respectively by the numerals 36, 38, and a pilot light 39.

Control 28 serves to adjust the sensitivity of the several stages of amplification incorporated in the device 10 to the proper level. The sensitivity control 28 should be adjusted as will subsequently be described, such that a reasonably loud sound triggers the stroboscopic tube 20. Advancing the sensitivity control 28 too much increases the sensitivity of the unit 10 to such a level as to trigger the stroboscopic or flash tube 20 with slight movements of the throat, as may occur during degluting saliva. The proper setting for the sensitivity control 28 is just slightly over the minimum necessary to trigger the stroboscopic tube 20, with the patient normally phonating.

The control 30 serves to adjust the intensity of the flash produced by the stroboscopic device or tube 20. The flash intensity control 30 should be set to provide sufficient light to clearly view the vocal cords, with the light level remaining sufficiently low to preserve the life of the tube 20.

The control 32 is for automatic phase control and is arranged to swing the vocal cords at a fixed rate (e.g. one displacement or part thereof per second) such that the vocal cords may be seen in slow motion through a full cycle of displacement; or by adjusting the control, for a part of the cycle of displacement.

The control 34 is for manual phase control and enables the observation of the vocal cords at any position in their natural displacement, which position may be changed throughout the full cycle of displacement by adjustment of the control 34. Each setting of the manual phase control 34, will correspond to a different position at which the cord can be seen; and the gradual and continuous rotation of this control will cause the vocal cords to appear to move at a rate synchronous with the gradual and continuous rotation under the control of the operator. Thus by adjusting the manual phase control 34 the position may sweep the phase of observation of the vocal cords at will.

Select or switch 36 has three switch positions and is normally in a middle position placing the unit in stand-by condition ready for use. The selector switch 36 may be switched to the right to a "continuous" position wherein the control of the stroboscopic light source 20 is automatic and responsive to phonation by the patient which is picked up by the microphone 22. The selective switch 36 may be switched to the left to a "remote" position wherein the circuit condition is such that the physician may control the flashing of the stroboscopic light source 20 by the remote control foot switch 24.

Finally, the selector switch 38 has two switch positions, one serving to connect both the automatic and manual phase controls 32, 34 into the circuit, and the other cutting the automatic phase control 32 out of the circuit.

Reference will now be made to FIG. 1 of the drawings for a general description for the several components making up the circuitry contained in the housing 12 of the larynx inspection device 10. Specifically, the microphone 22 is connected to a preamplifier 40 which includes two stages of preamplification and is arranged to amplify the varying relatively low frequency voice signal derived from the patient via the throat microphone 22.

The preamplified variable frequency voice signal, which is a complex wave form having many frequency components, is fed through a gain control 28 to an amplification and high frequency suppression circuit 44 containing two stages of amplification. In circuit 44 provision is made for rejection of some of the higher frequency components of the voice signal and for appropriate amplification of such voice signal.

The amplified voice signal is then fed to a differentiating circuit 46 having two stages of differentiating which is effective to convert the voice signal into a train of relatively sharp pulses having a repetition rate synchronized with the complex voice signal.

The differentiated voice signal is fed to a frequency divider 48, which is a conventional bistable multi-vibrator which serves to divide the frequency of the train of pulses. Frequency division is important in that flash or stroboscopic tubes cannot operate at high frequencies over long periods. Taking advantage of the persistency of the retina, every other, fourth, or sixth pulse etc. in the train may be employed for flashing the stroboscopic tube, with the persistency of the retina giving the impression that there is constant and continuous inspection.

The pulses selected by the frequency divider 48 are fed to a time delay device 50 which is an essentially conventional multi-vibrator in which the time delay between one stable state and the other stable state may be varied by the manual phase control 34 and/or the automatic phase control 33. The phase control 32 varies the output voltage of a phase shift oscillator 52 which determines the slow motion sweep rate for varying the time delay when the circuit is conditioned for automatic sweeping of the time of observation by closing of the manual selector switch 38.

The selective train of pulses, with a prescribed fixed time delay or a varying time delay, is fed to a triggering circuit 54 which produces a series of sharp negative pulses at a magnitude appropriate to flash the stroboscopic or glow tube 20.

The tube 20 as well as the rest of the circuit derives its power from a power supply 56 which is connected via the selector switch 36. As previously explained in general terms, the selector switch 36 includes a movable contactor 36a which may be selectively positioned on "stand-by" contact 36b, "remote" contact 36c or "continuous contact" 36d. When the selector switch 36 is in the position illustrated, the circuits are in stand-by condition. When the contactor 36a is in contact with the "remote" contact 36c, the circuit is conditioned for remote operation under control of foot switch 24. When the contactor 36a is in contact with the contact 36d, the circuit is conditioned for continuous operation under control of the phonation of the patient.

Referring now to FIG. 3, detailed reference will be made to the circuit of my larynx inspection device 10 which has been heretofore described generally in connection with the block diagram of FIG. 1. Specifically, a jack 60 is provided for the insertion therein of the plug of the throat microphone 22 to provide input to the preamplifier 40. The preamplifier 40 includes first and second stages of preamplification each of which is identical and includes a triode 62 having a grounded cathode 64. Signal is applied to the grid 66 of the triode 62 from the microphone jack 60, with the signal being developed across a grid leak resistance 68. The plate 70 of the tube 62 is connected to a line 72 which serves as a means of providing plate potential to the several stages of the circuit through a plate load resistance 74 connected in series with a further resistance 76. A filtering and decoupling condenser 78 is connected to the junction of the resistances 74, 76 as is generally understood and with resistance 76 provides signal isolation and prevents feedback between stages over line 72. The plate 70 of the triode 62 is coupled to the next stage of preamplification by a direct current blocking condenser 80, with a further condenser 82 being connected to the plate and to ground to provide a low impedance path for the rejection of the high frequency component of the voice signal.

The second stage of preamplification includes a triode 84 having a grounded cathode 86, with the grid 88 thereof being connected to the coupling condenser 80 and with the signal for the second stage being developed across the grid leak resistance 90. Potential is applied to the plate 92 of the triode 84 by a plate load resistance 94 connected in series with a further resistance 96 to the line 72, with a filtering and decoupling condenser 98 being connected to the junction of the resistances 94, 96 and to ground. The plate 92 of the triode 84 is shunted to ground by a condenser 100 which provides a low impedance path for the rejection of high frequency components of the voice signal. Further, the plate 92 is connected through a coupling condenser 102 to an integrating network including resistance 104 and condenser 106. The condenser 106 is charged from the resistance 104 and is effective to smooth out the complex wave form of the voice signal, as is the generally understood function of such integrating networks, with the voice signal being applied to the potentiometer 108 of the gain or sensitivity control 28. The potentiometer 108 is connected in series with the condenser 124, providing for further signal integration. The movable tap 110 of the sensitivity or gain control 28 is connected to a coupling condenser 112 and applies the signal input to the first stage of the two stage amplifier and further high frequency suppression circuit 44.

The amplifying and high frequency suppression circuit 44 include first and second stages which are substantially identical, with the first stage including a triode 114 having its cathode 116 connected to ground via a cathode biasing resistance 118. Signal output from the preamplifier 40 is applied to the grid 120, being developed across the grid leak resistance 122 connected to the coupling condenser 112. The plate 126 of the triode 114 is coupled to the line or source 72 of the plate potential by the plate load resistance 128 connected in series with the further resistance 130, with the junction of the resistances 128, 130 being connected to ground by the filtering and decoupling condenser 132. The amplified signal at the plate 126 of the triode 114 is connected via coupling condenser 134 to the second stage of the circuit 44 which is seen to include a triode 136 having its cathode 138 connected to ground via a cathode biasing resistance 140. The grid 142 is connected to the coupling condenser 134, with the signal being developed across the grid leak resistance 144 which is shunted by condenser 146 for high frequency suppression. The plate 148 of the triode 136 is connected to the line or source 72 by the plate load resistance 150 connected in series with the resistance 152, with the junction of these resistances being connected to ground by a filtering and decoupling condenser 154. The plate 148 of the triode 136 of the second stage of amplification is connected via coupling condenser 156 across a grid leak resistance 158 which serves as the input to the differentiating circuit 46.

The differentiating circuit 46 includes two stages of differentiation which are substantially identical and conventional, with the first stage including a triode 160 having a grounded cathode 162 and having its grid 164 connected to the junction of the coupling condenser 156 and the grid leak resistance 158. The plate 166 is connected to the line 72 via a plate load resistance 170 with the junction of the resistances 168, 170 being connected to ground via a filtering and decoupling condenser 172. The output of the plate 166 is connected via a coupling condenser 174 to a grid leak resistance 176, with the values of the condenser 174 and the resistance 176 being selected to achieve differentiation of the amplified signal. The second stage of differentiation includes a triode 178 which has a grounded cathode 180 and has its grid 182 connected to the grid leak resistance 176. The plate 184 of the triode 178 is connected to the line 72 via a plate load resistance 186 and a further resistance 188, with the junction of these resistances being connected to ground via a filtering and decoupling condenser 190. The plate 184 of the second stage of differentiation provide a signal substantially of the wave form shown which is connected via the coupling condenser 192 and the resistance 194 to the multivibrator circuit of the frequency divider 48, with the values of the condenser 192 and the resistance 194 being selected to achieve further differentiation of the amplified signal.

The frequency divider 48 which is a conventional bistable multivibrator circuit includes two triodes 196, 198 having their cathodes 202 connected to a common cathode biasing network 204 including a resistance and condenser in parallel and connected in series between the cathodes 200, 202 and ground. The grid 206 of the triode 196 has the voice signal applied thereto via the coupling condenser 208, with the signal being developed across the grid leak resistance 210; and in a similar fashion, the grid 212 of the triode 198 has signal applied thereto via the condenser 214 and the grid leak resistance 216. Plate potential is applied to the plate 218 of the triode 196 via the load resistance 220; and in a similar fashion, plate potential is applied to the plate 222 of the triode 198 via the load resistance 224. The grid 206 of the triode 196 is coupled to the plate 222 of the triode 198 via the coupling network 226 including the resistance and condenser in parallel with each other; and the grid 212 of the triode 198 is coupled to the plate 218 of the triode 196 via the coupling network 228. Normally one triode of this conventional multivibrator circuit is conductive and the signal input to the grids is effective to render the other triode conductive to switch the conductivity state of the multivibrator circuit, with the second stage conduction being effective to change the signal on the grid of the previously conducting stage to condition the circuit for the next pulse. Thus, as is generally understood, successive pulses of the train of pulses will cause the circuit to switch from one stable condition to the other; and effectively at the plate 222 of the triode 198, there will be conduction for every second pulse of input to the grid 206, 212 via the differentiating network 192, 194. In this manner, every second pulse of the train of pulses derived from the preceeding stages of preamplification and differentiation are fed to the time delay circuit 50. Although only one stage of frequency division has been shown it is within the contemplation of the invention to have further stages of frequency division, consistent of course with the requirement that the number of pulses to the stroboscopic device 20 should be sufficient to give the impression of continuous illumination of the larynx under study.

The frequency-divided amplified signal developed at the plate 222 of the triode 198 is applied via a differentiating network including the condenser 230 and the resistance 232 and a coupling condenser 234 as an input to the time delay circuit or device 50.

The time delay device 50 is a conventional monostable multivibrator circuit which includes two triodes 236, 238 having their cathodes 240, 242 connected to a common cathode biasing network 244 including a resistance and condenser in parallel with each other and in series with the respective cathodes and ground. The grid 246 of the triode 236 is connected to the coupling condenser 234 and is connected to ground via a grid resistor 248. As will be described, a fixed direct current potential and/or a relatively low frequency varying potential may be applied to the grid 246 over a lead 250 from the manual phase control 34 and/or the automatic amplitude phase control 32. The plate 252 of the triode 236 is connected to a source of plate potential via the load resistance 254 and is coupled via condenser 256 to the grid 258 of the triode 238. The grid 258 is connected to the source of plate potential via a polarizing resistance 260. Finally, the plate 262 of the triode 238 is connected to the source of plate potential via the load resistance 264. The circuit is arranged in conventional fashion with the triode 238 normally conducting and rendered non-conductive for an adjustable time interval as initiated by the signal applied to the grid from the frequency divider and for a period determined by the setting of the respective controls 32, 34 and the parameters of the circuit, particularly the condenser 256 which couples the plate of triode 236 to the grid of the triode 238. As is generally understood, when the tube 236 is rendered conductive the grid 258 of the triode 238 will receive a negative signal which renders the triode 238 non-conductive until such time as the grid is built up by the charge developed across the condenser 256 in the plate to grid circuit of the triodes 236, 238. At such time as the tube 238 is rendered conductive, a sharp negative pulse is developed in its plate circuit, which is connected via coupling condenser 266 to the triggering circuit 54.

The grid 246 of the triode 236 is rendered more or less positive with respect to ground, either at fixed increments of adjustment by the manual control 34 or at cyclically varying increments of adjustment by the automatic phase amplitude control 32 to vary the time delay of the time delay circuit 50. Specifically, the manual phase control 34 includes a potentiometer 268 which has an adjustable tap 270 connected via a voltage-dropping resistance 274, the value of the resistance 274 being selected to provide for the desired increment of adjustment in the potentiometer 268. By varying the position of the tap 270 and introducing a greater direct current biasing potential to the grid 246, the time delay of the flop cycle of the monostable multivibrator circuit can be increased thereby allowing the operator to observe a later phase of the movement of the vocal chords; and conversely by decreasing the setting of the potentiometer 268, 270, an earlier phase of the vocal chord movement may be observed.

The automatic phase control 52 includes a low frequency phase shift oscillator of essentially conventional design which is capable of putting out a sinusoidal signal, selected here for the purpose of illustration it being one cycle per second. The control 52 includes a triode 274 having its cathode 276 connected to ground by a cathode biasing resistance 278 and having its grid 280 coupled via a phase shift network 282 to the plate 284, the latter being connected to a source of plate potential via the load resistance 286. The oscillations developed at the plate 284 of the oscillator tube 274 are applied via the coupling condenser 288 to a potentiometer 290 which has an adjustable tap 292 connected via the selector switch 38 and the limiting resistance 294 to the line 250. The phase shift network 282 introduces a 180° shift between the grid 280 and the plate 284 of the oscillator 274 such that the oscillator will put out the required low frequency oscillations which is then applied across the potentiometer 290. The limiting resistance 294 is selected such that with the selector switch 38 closed, and with the potentiometer 292 at its maximum setting, one complete cycle of the natural displacement of the larnyx is displayed at the base or repetition rate established by the low frequency oscillator. By removing some of the resistance of the potentiometer 290 in series with the limiting resistance 294, successively smaller portions of the complete displacement of the vocal chords may be viewed at the base or repetition rate established by the low frequency oscillator. Thus the physician may readily inspect one complete cycle of the natural displacement of the larnyx at the rate of one per second, or a desired portion of the complete cycle in the same one second interval.

The sharp train of negative pulses derived at the plate of the second stage of the time delay device 50, with the variable time delay introduced therein by the respective automatic and manual phase controls 32, 34 is fed to the triggering circuit 54. The triggering circuit 54 includes two stages of amplification which takes the train of negative pulses and amplifies the same in an amount sufficient to derive the required triggering impulses for the stroboscopic device 20. Two stages of amplification are employed to obtain the requisite polarity for the train of pulses. Specifically, the triggering circuit 54 includes a first triode 296 which has a grounded cathode 298 and has its grid 300 connected to the coupling condenser 266, with a grid leak resistance 302 being provided across which the signal is developed. The plate 304 of the triode 296 is connected via a plate load resistance 306 to the source of plate potential, with the plate 304 being connected via the coupling condenser 308 to the grid leak resistance 310. The second stage of amplification includes a triode 312 having a grounded cathode 314 and having its grid 316 connected across the grid leak resistance 310. The plate 318 is connected to the source of plate current potential via the plate load resistance 320 and is coupled via the coupling condenser 322 to the triggering electrode 332 of the glow tube 324.

The stroboscopic device 20 includes a conventional glow tube 324 which may be a type 1D2L manufactured by Sylvania Electric Products, Inc. which incorporates a plate cathode discharge section 326, 328 a polarizing electrode 330 and a triggering electrode 332. The triggering electrode 332 is coupled to the condenser 322 and derives the train of sharp negative pulses which cause a gaseous breakdown in the plate-cathode section 326, 328. The intensity of the discharge is a function of the voltage derived from the plate load resistance 334 which charges an adjustable capacitance bank 336 such that a preestablished charge is available at the plate 326 for each timed breakdown of the glow tube 324. Operating potentials for the electrodes 330, 332 are developed by the voltage-dividing network including resistances 338, 340 connected to the electrode 330 and the further resistance 342 connected to the electrode 332.

From the foregoing, and by way of review, it will be appreciated that the complex voice signal, as picked up by the microphone 22 or by other appropriate electro-mechanical transducers, is subjected to several stages of amplification and high frequency suppression followed by one or more stages of frequency division. The train of sharp pulses, derived from the frequency divider 48 and in synchronism with the fundamental frequency of the voice signal picked up from the patient's larnyx, is then applied to the triggering circuit 54, with or without the introduction of a fixed or variable time delay, and employed to trigger the glow tube 324 of the stroboscopic device 20 in synchronism with the fundamental frequency of the voice signal. The light admitted from the stroboscopic tube is directed onto the patient's larnyx through the aid of a conventional larnyx mirror in accordance with techniques which are generally understood; and the physician may inspect the larnyx during phonation.

The output of the triggering circuit 54 is connected via the lead 344 to a power amplifier 348 which includes a triode 348 having its cathode 350 connected to ground via a cathode biasing resistor 352. The lead 344 is connected to the grid 354 of the tube 348, with the grid having a storage network 356 which provides substantially continuous conduction of the triode 348 for so long as pulse signals are applied via the lead 344 to the grid 354. The plate 358 of the triode 348 is connected to the energizing coil 360 of a control relay 362 connected in the circuit of FIG. 4, as will now be described. It will be appreciated, preliminary to a description of the control circuit shown in FIG. 4, that the relay 362 will be energized and the switch or contact 364 will be opened for so long as the patient phonates and develops signal input to the circuit FIG. 3 which brings about the application of the train of sharp negative pulses to the grid 354 of the power amplifier 348.

As seen in FIG. 4 the selector switch, which includes the movable contactor 36a, the standby position contact 36b, the remote position contact 36c and the continuous position contact 36d, comprises three sets or banks of contacts which are identical, with the lower set being connected in the plate circuit of the stroboscopic device 20, the middle set being connected in the energization circuit for the incandescent light source 18, and the upper set being connected to the pilot light 39 on the control panel 26 of the housing or console 12. The circuit of FIG. 4 has three input sources of potential, namely a source of filament potential 366 which is shown here to be 6.3 volts alternating source current, a source of plate potential 368 which is shown here to be a 270 volts direct current source, and a source for the requisite relay potentials 370, shown here as a 110 volt alternating current source.

In the standby position, as illustrated, the pilot light 39 does not receive operating potential, indicative of the fact that the circuit is not in condition for operation, but the field of observation is illuminated by the incandescent light source 18 which derives potential, over the lead 372 connected to the first bank of contact 36b, 36c and 36d and the lead 374 which is connected to the lead 372 and to the standby contact of the second bank of contacts. Of course in this position, no plate potential is applied to the stroboscopic device 20 in that no electrical connection is made to the standby contact of the lower bank of contacts.

When the switch contactor 36a is switched to the continuous position, the contactor 36a completes circuit over the upper contacts 36d of the upper, lower, and middle banks of contacts. In the continuous position, the pilot light 39 receives potential over the contact pair 36a, 36d, the lead 376 and the lead 372. The incandescent source 18 is connected via the lead 378 and the closed switch 364 to the source of potential 366 and will continuously illuminate the field for so long as the switch 364 remains closed, it being recalled that when the patient phonates the relay coil 360 in the plate circuit of the triode 348 receives an energizing potential to operate the relay 362 and open the switch 364 which in turn disrupts the energization circuit for the incandescent light source 18. Finally, the plate of the stroboscopic tube 20 derives plate potential over the contact pair 36a, 36d, of the lower bank and the lead 380 which is connected to the source of plate potential 368. Thus, in the continuous position, the field will be illuminated by the incandescent light source 18 until such time as the switch 364 is opened as a function of the phonation of the patient, at which time, the illumination of the field will be taken over by the stroboscopic device 20 which is triggered by the phonation of the patient.

When the switch 36 is moved to the remote control position wherein circuits are completed over the contactor 36a and the lower contact 36c, the pilot light 39 receives its energizing potential from the source 366 over the lead 372. The incandescent light source 18 is connected over the lead 382 and the normally closed switch 384 to the source of potential 366. The plate of the glow tube 20 is connected over the lower contact pair to the source of plate potential 368, but this energizing circuit is not completed in that there is a normally open switch 386 provided in the lead 388. The normally closed switch 384 and the normally-open switch 386 are controlled by a control relay 390 which has its energization coil 392 connected in a series energization circuit with a foot switch 24 and the source of alternating current potential 370. Thus with the selector switch 36 in the remote control position, the physician may depress the foot switch 24 to complete the energization circuit for the coil 392 of the control relay 390 which in turn opens the normally closed switch 384 and closes the normally opened switch 386. Opening of the normally closed switch 384 disrupts the energization circuit for the source of incandescent light 18, while closing of the normally opened switch 386 applies the requisite potential to the plate of the glow tube 20 such that when the patient phonates the field will be illuminated by the flash of the stroboscopic device.

In order to facilitate a more thorough understanding of the present invention, a typical sequence of operations will now be described:

The console or housing 12 is placed on an appropriate support, such as a table near the patient, and the throat microphone 22 is suspended around the neck of the patient, with the light housing 16 being appropriately directed such that the field may be illuminated either by the incandescent light source 18 or the stroboscopic light source 20. The several rotatable controls 28, 30, 32 and 34 are turned fully in the counterclockwise direction and the selector switches 36, 38 are respectively set in the standby and manual positions. After the requisite warm-up period, the selector switch 36 is switched to the continuous position and the patient is instructed to phonate. Simultaneously, the sensitivity control 28 is adjusted, turning the same in a clockwise direction until the stroboscopic light source 20 is triggered by the phonation of the patient. As previously indicated, a minimum setting for the sensitivity control 28, is desired to preclude spurious operation of the stroboscopic device 20, as might occur by the patient moving his head or agluting saliva.

Thereupon the intensity control 30 is adjusted to provide light at a sufficient level for the requisite observation. When the apparatus is adjusted, the physician will be provided with a visual observation of the vocal cords in one fixed position of the natural displacement of the cords.

If the physician desires to observe other relatively fixed positions of the vocal cords, the manual phase control 34 is adjusted; and for each instrumental adjustment, the physician will be able to observe a different relatively fixed or "frozen" position for the vocal cords. In some instances the physician may like to shift the position under observation, and by slowly turning the manual phase control 34 back and forth at a relatively slow rate the physician will be able to virtually track the movement of the vocal cord over a prescribed portion of their natural displacement.

Since it is usually desirable to have both hands free for the larynx inspection, the physician can switch the apparatus into automatic operation for slow motion study of the vocal cords during their natural displacement. This is accomplished by closing the selector switch 38 to connect the phase shift oscillator 52 into the circuit for automatic introducing various time delays. After shifting over to automatic operations, adjustment of the automatic phase control 32 allows the physician to view either the entire cycle of movement of the vocal cords at the time base established by the phase shift oscillator or a part thereof.

At such times as the physician desires to take the apparatus out of the automatic control of the patient incident to phonation, it is merely necessary to switch the selector switch 36 to the remote control position whereupon the physician may switch to stroboscopic operation by depressing the foot switch 24.

From the foregoing it will be appreciated that there has been provided according to the present invention an improved and simplified device for larynx inspection, enabling the physician, with ordinary skill and relatively simple procedures, to inspect the larynx of a patient during phonation. Such inspection may be made over the entire cycle of displacement of the vocal cords or apart thereof by simple manual adjustments or at any point during the natural displacement of the vocal cords. Further provision is made for the automatic illumination of the field during periods when stroboscopic inspection is not in progress and for the automatic switchover to stroboscopic operation incident to phonation by the patient.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A device for visual observation of the vocal cords during movement and soud emission comprising a microphone adapted to pick up the variable voice signal of a patient, means coupled to said microphone for amplifying said voice signal, means connected to said amplifying means for differentiating the amplified voice signal to derive a train of pulses at a repetition rate synchronized with the fundamental frequency of said voice signal, a stroboscopic light source, and triggering means controlled from said differentiating means by said train of pulses and controlling said stroboscopic light source for flashing said stroboscopic light source in synchronism with said vocal cords during movement and sound emission.

2. A device for visual observation of the vocal cords during movement and sound emission comprising a microphone adapted to pick up the relatively low frequency variable voice signal of a patient, means coupled to said microphone for amplifying said voice signal, means connected to said amplifying means for differentiating the amplified voice signal to derive a train of pulses at a repetition rate coincident with the fundamental frequency of said voice signal, a time delay device connected to said differentiating means for adjusting the phase relation of said train of pulses to enable observation of a prescribed phase of the movement of said vocal cords, a stroboscopic light source, and triggering means controlled from said time delay device and controlling said stroboscopic light source for flashing said stroboscopic light source in synchronism with said vocal cords during movement and sound emission.

3. A device for visual observation of the vocal cords during movement and sound emission comprising means for picking up and amplifying the relatively low frequency variable voice signal of a patient, means connected to said amplifying means for differentiating the amplified voice signal to derive a train of pulses at a repetition rate coincident with the fundamental frequency of said voice signal, a stroboscopic light source, triggering means controlled by said train of pulses and controlling said stroboscopic light source for flashing said stroboscopic light source in synchronism with said vocal cords during movement and sound emission, a continuous light source, means connecting said continuous light source to a source of potential, and means responsive to the pick-up of said voice signal for disconnecting said continuous light source from said source of potential.

4. A device for visual observation of the vocal cords during movement and sound emission comprising a microphone adapted to pick up the relatively low frequency variable voice signal of a patient, means coupled to said microphone for amplifying said voice signal, means connected to said amplifying means for differentiating the amplified voice signal to derive a train of pulses at a repetition rate coincident with the fundamental frequency of said voice signal, a frequency divider connected to said differentiating means for passing elected pulses in said train of pulses, a stroboscopic light source, triggering means controlled from frequency divider and controlling said stroboscopic light source for flashing said stroboscopic light source in synchronism with said vocal cords during movement and sound emission, an incandescent light source, means connecting said incandescent light source to a source of potential, and means responsive to the pickup by said microphone of said voice signal for disconnecting said incandescent light source from said source of potential.

5. A device for visual observation of the vocal cords during movement and sound emission comprising a microphone, means attached to said microphone for securing said microphone against the throat of a patient so that said microphone will pick up the relatively low frequency variable voice signal of a patient, means coupled to said microphone for amplifying said voice signal, means connected to said amplifying means for differentiating the amplified voice signal to derive a train of pulses at a repetition rate coincident with the fundamental frequency of said voice signal, a frequency divider connected to said differentiating means for passing selected pulses in said train of pulses, a stroboscopic light source and triggering means controlled by said selected pulses from said frequency divider and controlling said stroboscopic light source for flashing said stroboscopic light source in synchronism with said vocal cords during movement and sound emission.

6. A device for visual observation of the vocal cords during movement and sound emission comprising a microphone for picking up the relatively low frequency variable voice signal of a patient, means coupled to said microphone for amplifying said voice signal, means connected to said amplifying means for differentiating the amplified voice signal to derive a train of pulses at a repetition rate coincident with the fundamental frequency of said voice signal, a frequency divider connected to said differentiating means for passing selected pulses in said train of pulses, a time delay device connected to said frequency divider and including manual and automatic adjustment means for adjusting the phase relation of said selected pulses of said train to enable observation of various phases of the movement of said vocal cords, a stroboscopic light source, means mounting said stroboscopic light source for directing said stroboscopic light source on the vocal cords of a patient, and triggering means controlled from said time delay device and controlling said stroboscopic light source for flashing said stroboscopic light source in synchronism with said vocal cords during movement and sound emission.

7. A device for visual observation of the vocal cords during movement and sound emission comprising a microphone, means attached to said microphone for securing said microphone against the throat of a patient so that said microphone will pick up the relatively low frequency variable voice signal of a patient, means coupled to said microphone for amplifying said voice signal, means connected to said amplifying means for differentiating the amplified voice signal to derive a train of pulses at a repetition rate coincident with the fundamental frequency of said voice signal, a time delay device connected to said differentiating means and including manual and automatic adjustment means for adjusting the phase relation of said pulses of said train to enable observation of various phases of the movement of said vocal cords, a stroboscopic light source, means mounting said stroboscopic light source for directing said stroboscopic light source on the vocal cords of a patient, triggering means controlled from said time delay device and controlling said stroboscopic light source for flashing said stroboscopic light source in synchronism with said vocal cords during movement and sound emission, an incandescent light source, means connecting said incandescent light source to a source of potential, and means responsive to the pick-up by said microphone of said voice signal for disconnecting said incandescent light source from said source of potential.

8. A device according to claim 1 including a frequency divider connected to the differentiating means for passing selected pulses in said train of pulses and wherein said triggering means is controlled by said selected pulses.

9. A device according to claim 1 including an incandescent light source, means connecting said incandescent light source of potential, and means responsive to the pick-up by said microphone of said voice signal for disconnecting said incandescent light source from said source of potential.

10. A device according to claim 1 including means operatively connected to said stroboscopic light source for adjusting the intensity of the flash produced by said stroboscopic light source.

11. A device according to claim 1 including a gain control in the amplifying means for adjusting the sensitivity of said device.

References Cited in the file of this patent

UNITED STATES PATENTS

| | | |
|---|---|---|
| 2,174,176 | Journeaux et al. | Sept. 26, 1939 |
| 2,286,030 | Young et al. | June 9, 1942 |
| 2,761,994 | Quitmeyer | Sept. 4, 1956 |